United States Patent
Nara et al.

(10) Patent No.: US 11,408,747 B2
(45) Date of Patent: Aug. 9, 2022

(54) IN-VEHICLE APPARATUS AND INFORMATION PRESENTATION METHOD

(71) Applicants: Clarion Co., Ltd., Saitama (JP); KISHI MIRAI INC., Yokohama (JP)

(72) Inventors: Norikazu Nara, Saitama (JP); Noriyuki Abe, Saitama (JP); Makoto Orino, Hitachi (JP); Takaaki Yashiro, Hitachi (JP); Toshihiro Mochizuki, Saitama (JP); Norimasa Kishi, Yokohama (JP)

(73) Assignee: Clarion Co., Ltd., Kanagawa (JP)

( * ) Notice: Subject to any disclaimer, the term of this patent is extended or adjusted under 35 U.S.C. 154(b) by 77 days.

(21) Appl. No.: 16/772,727

(22) PCT Filed: Dec. 7, 2018

(86) PCT No.: PCT/JP2018/045164
§ 371 (c)(1),
(2) Date: Jun. 12, 2020

(87) PCT Pub. No.: WO2019/117047
PCT Pub. Date: Jun. 20, 2019

(65) Prior Publication Data
US 2020/0318986 A1    Oct. 8, 2020

(30) Foreign Application Priority Data

Dec. 14, 2017    (JP) .............................. JP2017-240005

(51) Int. Cl.
*G01C 21/34*    (2006.01)
*G01C 21/36*    (2006.01)

(52) U.S. Cl.
CPC ..... *G01C 21/3484* (2013.01); *G01C 21/3407* (2013.01); *G01C 21/3697* (2013.01)

(58) Field of Classification Search
CPC ............ G01C 21/3484; G01C 21/3407; G01C 21/3697
See application file for complete search history.

(56) References Cited

U.S. PATENT DOCUMENTS

| | | | |
|---|---|---|---|
| 2010/0057340 A1* | 3/2010 | Kravets .............. | G01C 21/3484 701/416 |
| 2013/0103313 A1* | 4/2013 | Moore ............... | G01C 21/3626 701/533 |

(Continued)

FOREIGN PATENT DOCUMENTS

| JP | 2000-46575 A | 2/2000 |
|---|---|---|
| JP | 2006-38742 A | 2/2006 |

(Continued)

OTHER PUBLICATIONS

Japanese Office Action dated Jun. 29, 2021 regarding Japanese Patent Application No. 2017-240005 corresponding to U.S. Appl. No. 16/772,727 (4 pages) with English Translation (4 pages).

(Continued)

*Primary Examiner* — Rachid Bendidi
*Assistant Examiner* — Selena M Jin
(74) *Attorney, Agent, or Firm* — Lewis Roca Rothgerber Christie LLP (57) ABSTRACT

An in-vehicle apparatus mounted in a vehicle includes: a map information storage unit that stores map information; a communication control unit that acquires traffic information; a travel history database in which a travel history of the vehicle with respect to each road is recorded; a route estimation unit that estimates a travel route of the vehicle by using the map information and the travel history database; a traveling time calculation unit that calculates actual traveling time of the vehicle with respect to the travel route and calculates predicted traveling time required when traveling the travel route estimated by the route estimation unit by (Continued)

using the traffic information; and a display control unit that performs control to display a map screen indicating the travel route and display the actual traveling time and the predicted traveling time together with the map screen.

8 Claims, 8 Drawing Sheets

(56) References Cited

U.S. PATENT DOCUMENTS

| | | | | |
|---|---|---|---|---|
| 2015/0160027 | A1* | 6/2015 | Kitchel | G01S 19/19 |
| | | | | 701/533 |
| 2016/0069695 | A1* | 3/2016 | Broadbent | G01C 21/3415 |
| | | | | 701/411 |
| 2016/0229414 | A1* | 8/2016 | Desnoyer | B60W 50/0097 |
| 2017/0138751 | A1* | 5/2017 | Martyniv | G06Q 10/02 |
| 2017/0292847 | A1* | 10/2017 | Ota | G01C 21/34 |
| 2017/0314957 | A1* | 11/2017 | Mimura | G05D 1/021 |
| 2017/0363437 | A1* | 12/2017 | Baracco | G01C 21/367 |
| 2018/0074497 | A1* | 3/2018 | Tsuji | G01C 21/3617 |
| 2018/0259345 | A1* | 9/2018 | Wang | G06Q 10/04 |
| 2020/0049524 | A1* | 2/2020 | Ota | G01C 21/34 |

FOREIGN PATENT DOCUMENTS

| | | |
|---|---|---|
| JP | 2007-170927 A | 7/2007 |
| JP | 2017-67582 A | 4/2017 |
| JP | 2017-151566 A | 8/2017 |
| JP | 2017-198585 A | 11/2017 |
| WO | WO 2016/030986 A1 | 3/2016 |

OTHER PUBLICATIONS

International Search Report of corresponding PCT/JP2018/045164 with English translation, and Written Opinion of corresponding PCT/JP2018/045164, dated Mar. 12, 2019, 10 pages.

* cited by examiner

| LINK ID | DIRECTION | THE NUMBER OF TIMES OF PASSAGES | AVERAGE PASSING-THROUGH TIME |
|---|---|---|---|
| L1 | L1→L2 | 10 | 2 MINUTES |
| L2 | L2→L3 | 8 | 10 MINUTES |
|  | L2→L10 | 2 | 8 MINUTES |
| L3 | L3→L4 | 8 | 11 MINUTES |
|  | L3→L5 | 0 | – |
| L4 | – | 8 | 5 MINUTES |
| L5 | – | 0 | – |
| L10 | L11 | 2 | 4 MINUTES |
| L11 | – | 2 | 3 MINUTES |

IN-VEHICLE APPARATUS AND INFORMATION PRESENTATION METHOD

CROSS-REFERENCE TO RELATED APPLICATION(S)

This application is a U.S. National Phase Patent Application and claims priority to and the benefit of International Application Number PCT/JP20181045164, filed on Dec. 7, 2018, which claims priority of Japanese Patent Application Number 2017-240005, filed on Dec. 14, 2017, the entire contents of all of which are incorporated herein by reference.

TECHNICAL FIELD

The present invention relates to an in-vehicle apparatus and an information presentation method.

BACKGROUND ART

There has been conventionally known a navigation apparatus for recording a history of roads where a vehicle traveled in the past, and searching for a route to a destination based on this history of roads. PTL 1 mentioned below discloses a navigation apparatus including: a storage means that stores travel frequency data corresponding to each road; a frequency update means that updates the travel frequency data corresponding to roads where a vehicle has actually traveled; and a route calculation means that performs arithmetic operation of a route cost based on the frequency by inputting a destination and calculates an optimum route to reach the destination.

CITATION LIST

Patent Literature

PTL 1: Japanese Patent Application Laid-Open (Kokai) Publication No, 2000-46575

SUMMARY OF THE INVENTION

Problems to be Solved by the Invention

The navigation apparatus disclosed in PTL 1 can find roads where the vehicle often passes through as the optimum route; however, when a longer traveling time than usual is required due to congestion or the like, the above-mentioned navigation apparatus cannot notify the user to that effect.

Means to Solve the Problems

An in-vehicle apparatus according to the present invention is mounted in a vehicle and includes: a map information storage unit that stores map information; a communication control unit that acquires traffic information; a travel history database in which a travel history of the vehicle with respect to each road and traveling time with respect to the travel history are recorded; a route estimation unit that estimates a travel route of the vehicle by using the map information and the travel history database; a traveling time calculation unit that calculates actual traveling time of the vehicle with respect to the travel route estimated by the route estimation unit by using the traveling time recorded in the travel history database and calculates predicted traveling time required when traveling along the travel route estimated by the route estimation unit by using the traffic information acquired by using the communication control unit; and a display control unit that performs control to display a map screen indicating the travel route and display the actual traveling time and the predicted traveling time together with the map screen.

An information presentation method according to the present invention includes: a step of acquiring traffic information; a step of recording a travel history of a vehicle with respect to each road and traveling time with respect to the travel history; a step of estimating a travel route of the vehicle by using map information and the recorded travel history; a step of calculating actual traveling time of the vehicle with respect to the estimated travel route by using the recorded traveling time and calculating predicted traveling time required when traveling along the estimated travel route by using the acquired traffic information; a step of displaying a map screen indicating the travel route; and a step of displaying the actual traveling time and the predicted traveling time together with the map screen.

Advantageous Effects of the Invention

Regarding a road(s) where the vehicle is going to pass through from now, the user can be notified of the difference in traveling time from usual traveling time according to the present invention.

DESCRIPTION OF EMBODIMENTS

First Embodiment

Figure 1:
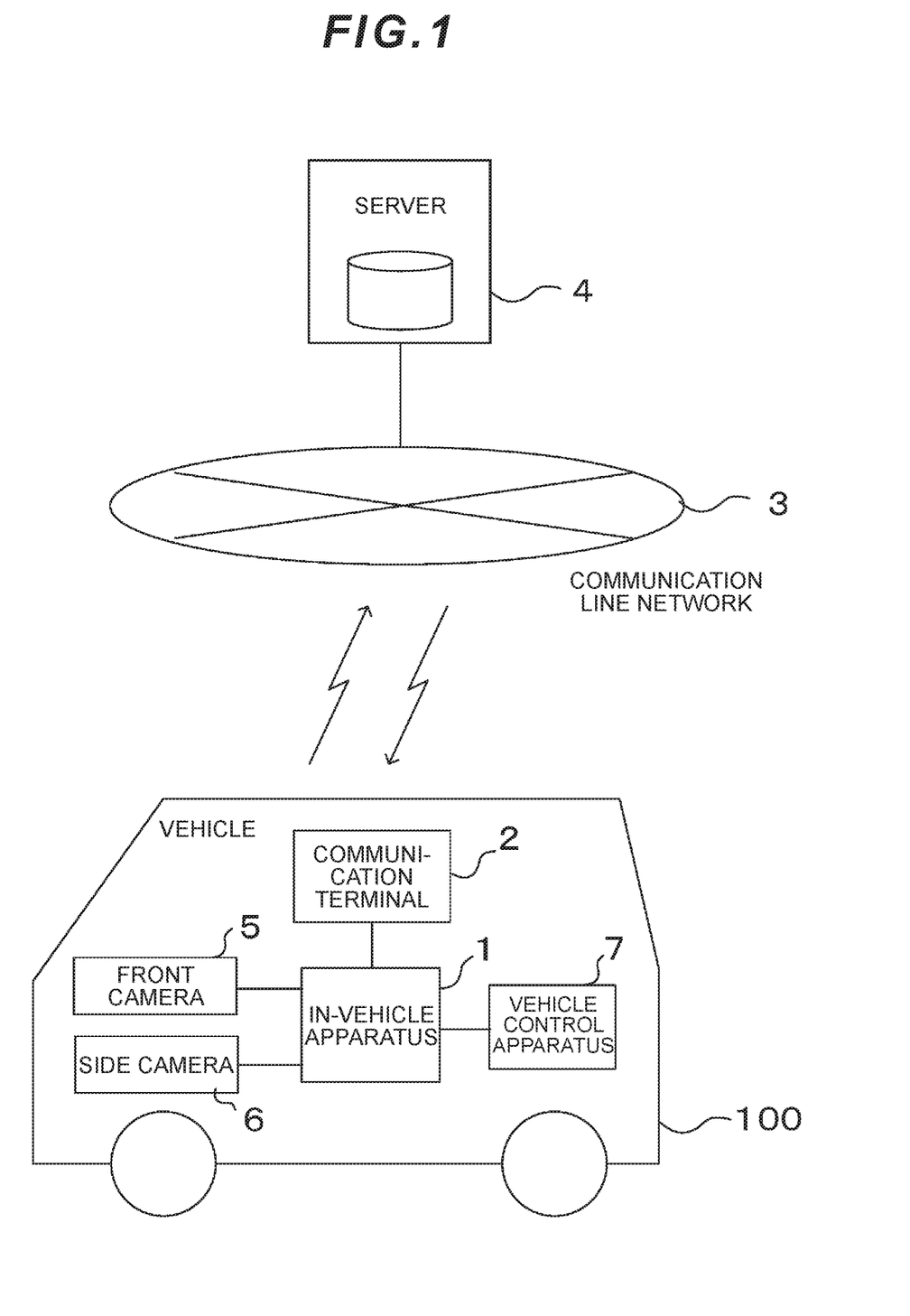
FIG. 1 is a configuration diagram of an information provision system according to one embodiment of the present invention.

A first embodiment of the present invention will be explained with reference to the drawings. FIG. 1 is a configuration diagram of an information provision system according to one embodiment of the present invention. The information provision system illustrated in FIG. 1 is designed to provide a user who rides in a vehicle 100 with various information according to a traveling status of the vehicle 100 and is configured of an in-vehicle apparatus 1 and a communication terminal 2, which are mounted in the vehicle 100, a communication line network 3, and a server 4. Incidentally, the in-vehicle apparatus 1 and the communication terminal 2 are connected via wired or wireless connection.

The in-vehicle apparatus 1 displays a map screen and provides the user, who is a driver of the vehicle 100, with map information. The in-vehicle apparatus 1 is connected to: a front camera 5 and a side camera 6 which are mounted in the vehicle 100, respectively, facing the front side and the lateral side of the vehicle 100; and a vehicle control apparatus 7 that performs various processing and control relating to traveling of the vehicle 100. The vehicle control apparatus 7 is, for example, an ECU (Electronic Control Unit) and the vehicle 100 is equipped with various types of vehicle control apparatuses depending on their functions and control objects.

The communication terminal 2 wirelessly connects to the communication line network 3 as necessary under control of the in-vehicle apparatus 1. The communication line network 3 is connected to the server 4. Specifically, the in-vehicle apparatus 1 can communicate with the server 4 by connecting to the server 4 via the communication terminal 2 and the communication line network 3. When the communication terminal 2 and the communication line network 3 are connected wirelessly, wireless base stations which the communication line network 3 has and which are not illustrated in the drawing are used. These wireless base stations can wirelessly communicate with the communication terminal 2 located within their surrounding specified communication areas, and are installed at various locations. Incidentally, the communication terminal 2 is, for example, a mobile phone. Furthermore, the communication line network 3 is constructed by, for example, a mobile phone network or the Internet.

The server 4 stores a travel history of the vehicle 100. The in-vehicle apparatus 1 can estimate a travel route of the vehicle 100 and provide the user with the information by downloading the travel history of the vehicle 100 from the server 4.

Incidentally, FIG. 1 illustrates an example where one in-vehicle apparatus 1 mounted in one vehicle 100 is connected to the server 4; however, practically, in-vehicle apparatuses respectively mounted in a large number of vehicles are connected to the server 4 and each in-vehicle apparatus provides their user with information. In this embodiment, actions of one in-vehicle apparatus 1 among them will be explained as a representative example, but other in-vehicle apparatuses operate in the same manner.

Figure 2:
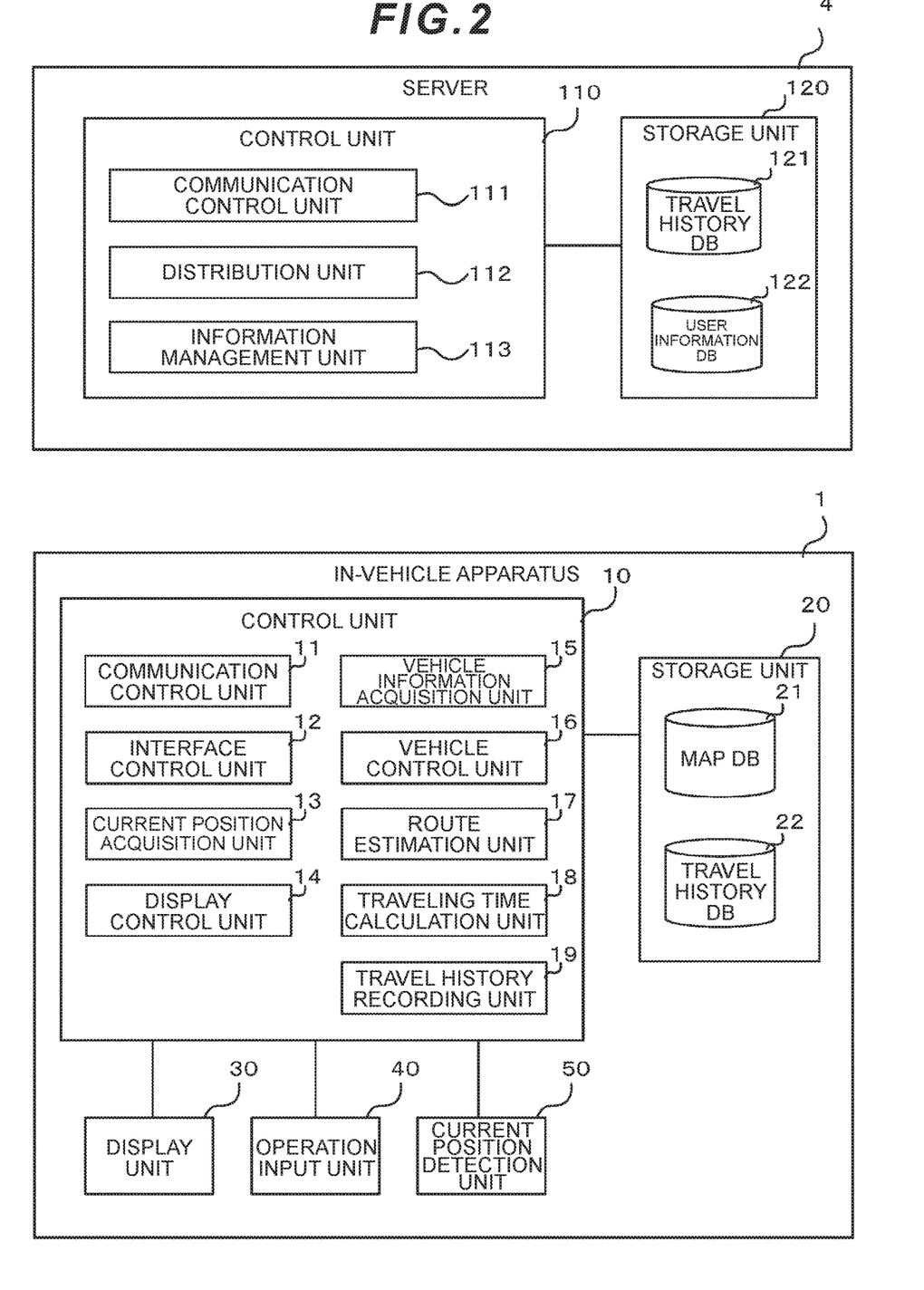
FIG. 2 is a configuration diagram of an in-vehicle apparatus and a server according to one embodiment of the present invention.

FIG. 2 is a configuration diagram of the in-vehicle apparatus 1 and the server 4 according to one embodiment of the present invention. The in-vehicle apparatus 1 includes, as illustrated in FIG. 2, a control unit 10, a storage unit 20, a display unit 30, an operation input unit 40, and a current position detection unit 50. The server 4 includes a control unit 110 and a storage unit 120.

The control unit 10 for the in-vehicle apparatus 1 is configured of a CPU, a ROM, a RAM, and so on which are not illustrated in the drawing and performs various processing and arithmetic operations to operate the in-vehicle apparatus 1. The control unit 10 has, as its functions, the respective functional blocks of a communication control unit 11, an interface control unit 12, a current position acquisition unit 13, a display control unit 14, a vehicle information acquisition unit 15, a vehicle control unit 16, a route estimation unit 17, a traveling time calculation unit 18, and a travel history recording unit 19. The control unit 10 can implement these functional blocks by, for example, decompressing programs, which are stored in the ROM, in the RAM and having the CPU execute the programs. Incidentally, the details of these functional blocks possessed by the control unit 10 will be explained later.

The storage unit 20 is a nonvolatile storage medium and is configured by using, for example, an HDD (hard disk drive), an SSD (solid state drive), or a memory card. The storage unit 20 includes a map DB 21 which is a database formed with various information relating to maps, for example, information such as positions, connections, shapes, widths, and the number of lanes of roads and information such as landforms, city names, area names, and various facilities (POI: Point of Interest) on the map. Specifically speaking, map information for displaying a map screen on the in-vehicle apparatus 1 is stored as the map DB 21 in the storage unit 20. Furthermore, the storage unit 20 includes a travel history DB 22 which indicates a travel history of the vehicle 100, Incidentally, some or all of programs executed by the CPU in the control unit 10 may be stored in the storage unit 20.

The display unit 30 displays various images and videos according to control of the display control unit 14. The display unit 30 is configured by using, for example, a liquid-crystal display.

The operation input unit 40 accepts operation input from the user and outputs operation information to the control unit 10 according to the operation content. The operation input unit 40 is configured of, for example, a touch panel and various kinds of switch groups which are integrated with the display unit 30.

The current position detection unit 50 detects a current position of the vehicle 100, that is, a current position of the user who is riding in the vehicle 100 and outputs the detection result to the control unit 10. The current position detection unit 50 is configured by using, for example, a GPS sensor. Incidentally, when the GPS sensor is used as the current position detection unit 50, the current position based on a GPS signal may be calculated at the control unit 10. The current position of the vehicle 100 (the current position of the user) detected by the current position detection unit 50 will be hereinafter simply referred to as the "current position."

The control unit 110 for the server 4 is configured of a CPU, a ROM, a RAM, and so on which are not illustrated in the drawing and performs various processing and arithmetic operations to operate the server 4. The control unit 110 has, as its functions, the respective functional blocks of a communication control unit 111, a distribution unit 112, and an information management unit 113. The control unit 110 can implement these functional blocks by, for example, decompressing programs, which are stored in the ROM, in the RAM and having the CPU execute the programs. Incidentally, the details of these functional blocks possessed by the control unit 110 will be explained later.

The storage unit 120 is a nonvolatile storage medium and is configured by using, for example, an HDD (hard disk drive), an SSD (solid state drive), or a memory card. The storage unit 120 includes: a travel history DB 121 which is a database formed of travel histories of a large number of vehicles including the vehicle 100 connected to the server 4; and a user information DB 122 which is a database of user information about the users of the respective in-vehicle apparatuses. Incidentally, some or all of programs executed by the CPU in the control unit 110 may be stored in the storage unit 120.

Next, the respective functional blocks of the control unit 10 for the in-vehicle apparatus 1 and the control unit 110 for the server 4 will be explained.

The communication control unit 11 controls the communication terminal 2 when the in-vehicle apparatus 1 communicates with the server 4 via the communication terminal 2 and the communication line network 3, The in-vehicle apparatus 1 can transmit and receive information to and from the server 4 by controlling the communication terminal 2 using the communication control unit 11.

The interface control unit 12 performs interface control when the in-vehicle apparatus 1 communicates with the front camera 5, the side camera 6, and the vehicle control apparatus 7, respectively. The in-vehicle apparatus 1 communicates with the front camera 5, the side camera 6, and the vehicle control apparatus 7, respectively, via the interface control performed by the interface control unit 12 and can thereby acquire captured images output from the front camera 5 and the side camera 6 and issue action instructions to the vehicle control apparatus 7.

The current position acquisition unit 13 acquires the current position detection result from the current position detection unit 50 and identifies a link corresponding to a road where the vehicle 100 is traveling by referring to the map DB 21. Then, for example, if the link changes as the vehicle 100 passes through an intersection, the current position acquisition unit 13 notifies the travel history recording unit 19 to that effect.

The display control unit 14 performs control to have the display unit 30 display the map screen by using the map DB 21 stored in the storage unit 20. This map screen: indicates a travel route from the current position to the destination where the vehicle 100 plans to be headed from now; and includes actual traveling time and predicted traveling time of the vehicle with respect to the travel route. Incidentally, a specific example of the map screen displayed on the display unit 30 by the display control unit 14 will be explained later. Moreover, the display control unit 14 can provide the user with, for example, images indicating the ambient environment of the vehicle 100, which are generated based on the captured images acquired from the front camera 5 and the side camera 6, by having the display unit 30 display such images. Furthermore, when an external display device is connected to the in-vehicle apparatus 1 the display control unit 14 performs control to have the external display device display the map image and the captured images acquired from the front camera 5 and the side camera 6.

The vehicle information acquisition unit 15 acquires various vehicle information about the traveling status of the vehicle 100. The vehicle information acquired by the vehicle information acquisition unit 15 includes, for example, the captured images which are output from the front camera 5 and the side camera 6 and control information which is output from the vehicle control apparatus 7. The vehicle information acquisition unit 15 can acquire these pieces of vehicle information via the interface control unit 12.

The vehicle control unit 16 controls the traveling status of the vehicle 100 by issuing an action instruction to the vehicle control apparatus 7 on the basis of, for example, map information around the current position acquired from the map DB 21 and the vehicle information acquired by the vehicle information acquisition unit 15. Automatic driving of the vehicle 100 is implemented by this action of the vehicle control unit 16. Incidentally, the vehicle control unit 16 can issue the action instruction to the vehicle control apparatus 7 via the interface control unit 12.

The route estimation unit 17 estimates a travel route for the vehicle 100 to travel from now on the basis of the map DB 21 and the travel history DB 22. The route estimation unit 17 estimates the travel route, for example, at the timing when the in-vehicle apparatus 1 is activated by, for example, turning on an ACC power source of the vehicle or at the timing when it is detected that the vehicle 100 has traveled on a new link which is not included in the estimated travel route. Incidentally, a history of routes where the vehicle 100 traveled in the past is recorded on a link string basis in the travel history DB 22 by the travel history recording unit 19. The route estimation unit 17 can: estimate the destination where the user is headed by referring to this travel history DB 22; and predict a travel route for the vehicle 100 from the current position to the destination.

The traveling time calculation unit 18 calculates traveling time when the vehicle 100 travels along the travel route estimated by the route estimation unit 17. The traveling time calculated by the traveling time calculation unit 18 includes actual traveling time of the vehicle 100 based on the travel history DB 22 and predicted traveling time according to the current road status.

Figure 3:
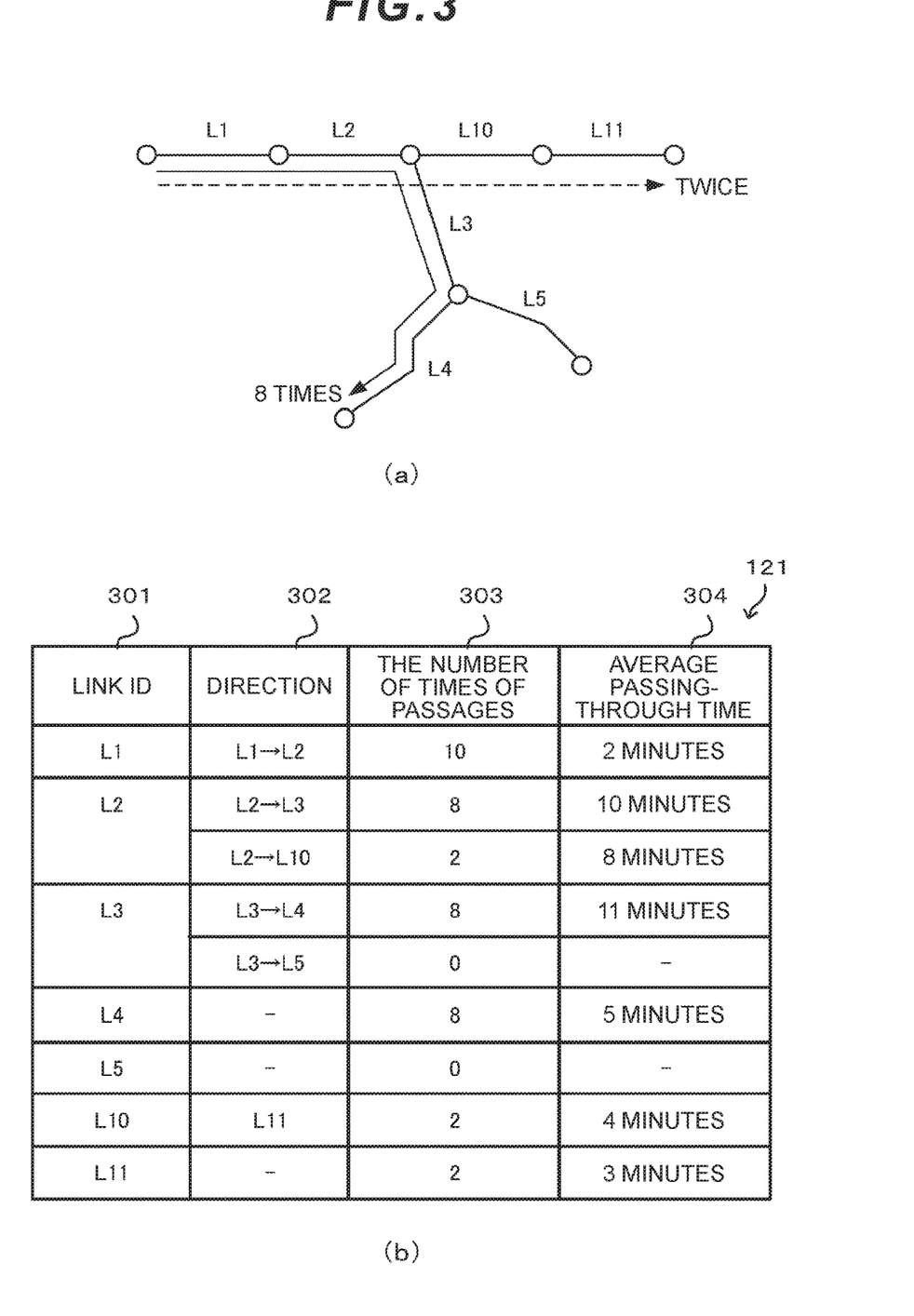
FIG. 3 is a diagram illustrating a data structure example of a travel history DB.

The travel history recording unit 19 records the travel history of the vehicle 100, on a link string basis, based on a traveling link of the vehicle 100 identified by the current position acquisition unit 13. When the travel history recording unit 19 is notified by the current position acquisition unit 13 that the traveling link of the vehicle 100 has changed, it records the travel history of the vehicle 100 in the travel history DB 22 by using a data structure as illustrated in FIG. 3 described later. Incidentally, the travel history of the vehicle 100 recorded in the travel history DB 22 is transmitted by the communication control unit 11 from the in-vehicle apparatus 1 to the server 4 at specified timing and is reflected in the travel history DB 121 of the server 4. Accordingly, the travel history of the vehicle 100 can be synchronized between the in-vehicle apparatus 1 and the server 4.

The communication control unit 111 performs communication control which is required when the server 4 communicates with the in-vehicle apparatus 1 via the communication terminal 2 and the communication line network 3. The communication control unit 111 performs; for example, interface processing between the server 4 and the communication line network 3 upon the communication control.

The distribution unit 112 distributes information which is recorded in the travel history DB 121 in response to a distribution request from the in-vehicle apparatus 1. For example, when receiving the distribution request for the travel history of the vehicle 100 from the in-vehicle apparatus 1, the distribution unit 112 identifies the user of the in-vehicle apparatus 1 based on the user information DB 122, acquires the travel history of the vehicle 100 corresponding to the relevant user from the travel history DB 121, and distributes it to the in-vehicle apparatus 1. Incidentally, when the distribution unit 112 distributes the information to the in-vehicle apparatus 1, the communication control unit 111 is used to perform communication between the server 4 and the in-vehicle apparatus 1.

The information management unit 113 manages information stored in the storage unit 120. For example, the information management unit 113 updates the user information DB 122 on the basis of information input from an operator of the server 4 and the user of the in-vehicle apparatus 1. Furthermore, when the latest travel history of the vehicle 100 is transmitted from the in-vehicle apparatus 1, the information management unit 114 updates the travel history DB 121 based on this latest travel history and reflects the latest travel history in the travel history DB 121.

FIG. 3 is a diagram illustrating a data structure example of the travel history DB 121. FIG. 3A illustrates an example of link strings whose travel history is recorded in the travel history DB 121; and FIG. 3B illustrates a data structure example of the travel history DB 121 corresponding to the link strings in FIG. 3A.

The link strings illustrated in FIG. 3A are composed of links L1, L2, L3, L4, L5, L10, and L11. The link L1 connects to the link L2 and the link L2 connects the link L3 and L10. The link L3 connects to the link L4 and L5 and the link L10 connects to the link L11. Regarding the link strings having such a connection structure, let us assume that the number of times the vehicle 100 has passed through the links L1, L2, L10, and L11 in this sequential order is twice and the number of times the vehicle 100 has passed through the links L1, L2, L3, and L4 in this sequential order is eight times, Incidentally, let us assume that the vehicle 100 has never passed through the link L5.

In the above-described case, the travel history of the vehicle 100 is recorded in the travel history DB 121, for example, in the data structure illustrated in FIG. 3B. Regarding the data structure in FIG. 3B, the travel history DB 121 is configured of a plurality of records according to combinations of the links of the link strings in FIG. 3A and traveling directions and has respective fields of a link ID 301, a direction 302, the number of times of passages 303, and average passing-through time 304.

The link ID 301 stores an ID number of each link corresponding to each record in the travel history DB 121. The direction 302 stores information indicating towards which link the vehicle 100 was traveling from the relevant link as a traveling direction when the vehicle 100 passed through the link indicated with the link ID 301. The number of times of passages 303 stores the number of times of passages by the vehicle 100 for each combination of the link ID 301 and the direction 302. The average passing-through time 304 stores an average value of the passing-through time when the vehicle 100 has traveled along the relevant link with respect to each traveling direction indicated in the direction 302.

The travel history of each vehicle is recorded in the travel history DB 121 in the data structure described above with respect to a plurality of vehicles including the vehicle 100. Furthermore, the travel history of the vehicle 100 is also recorded in the travel history DB 22 of the in-vehicle apparatus 1 in a similar data structure. Incidentally, the data structure of the travel history DB 121 illustrated in FIG. 3 is merely an example; and an arbitrary data structure can be used as long as the travel history of each vehicle can be recorded appropriately.

Figure 4:
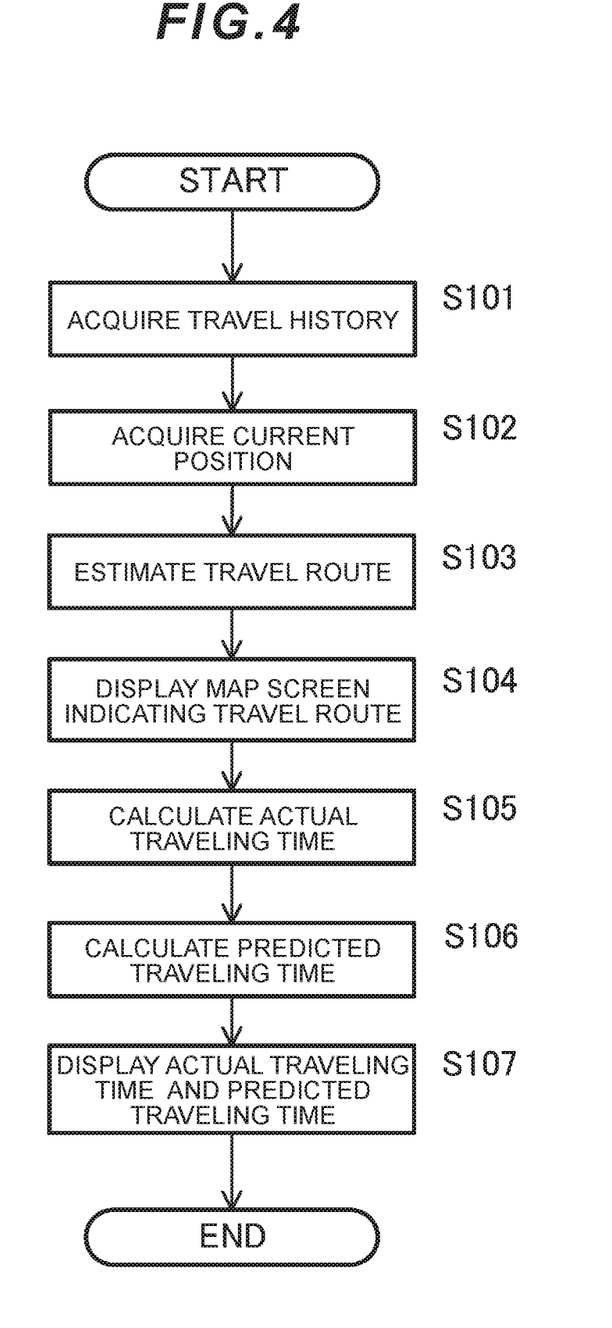
FIG. 4 is a flowchart illustrating actions of the in-vehicle apparatus in the information provision system according to a first embodiment of the present invention.

Next, the details of actions of the in-vehicle apparatus 1 and the server 4 when providing the user with information will be explained. FIG. 4 is a flowchart illustrating the actions of the in-vehicle apparatus 1 in the information provision system according to the first embodiment of the present invention. In this embodiment, the control unit 10 for the in-vehicle apparatus 1 starts a processing flow illustrated in FIG. 4, for example, when the in-vehicle apparatus 1 is activated or when the destination is set to the in-vehicle apparatus 1.

In step S101, the control unit 10 acquires the travel history of the vehicle 100 from the server 4. Under this circumstance, the control unit 10 transmits a distribution request for the travel history to the server 4 by using the communication control unit 11. After receiving the distribution request from the in-vehicle apparatus 1, the server 4 has the distribution unit 112 acquire the travel history of the vehicle 100 from the travel history DB 121. Then, the server 4 distributes the acquired travel history to the in-vehicle apparatus 1. After receiving the travel history distributed from the server 4 in this way, the control unit 10 stores the received travel history in the travel history DB 22 and completes the processing in step 3101.

In step S102, the control unit 10 has the current position acquisition unit 13 acquire the current position from the current position detection unit 50.

In step 3103, the control unit 10 has the route estimation unit 17 estimate the travel route of the vehicle 100. Under this circumstance, the user's destination is estimated by referring to the travel history DB 22 and taking into consideration the current position acquired in step 3102, the current date and time, the user's schedule information, and so on. Regarding the user's schedule information, for example, information previously registered by the user is recorded as part of the user information in the user information DB 122 of the server 4, so that this schedule information can be used to estimate the travel route by acquiring the schedule information from the server 4. Then, a specified number of, such as three, combinations of roads which are estimated from the current position to the destination are selected in descending order of travel frequency of the vehicle 100 indicated by the travel history DB 22 on the basis of the map DB 21 and the travel history DB 22. Consequently, a plurality of travel routes from the current position to the destination are estimated. Under this circumstance, the combination of roads which constitute each travel route may be selected so that the distance or ratio of overlapping roads between the travel routes becomes equal to or less than a fixed value. Incidentally, when a route to the destination which is set by the user is guided by using a navigation function of the in-vehicle apparatus 1, the processing in step 3103 may be omitted by using this route as the travel route of the vehicle 100.

In step S104, the control unit 10 has the display control unit 14 read the map information within a specified range including the current position and the destination from the map DB 21 and display the map screen indicating the plurality of travel routes estimated in step S103 on the display unit 30. Under this circumstance, it is preferable that each travel route be displayed in a display form different from that of the other roads and the travel routes themselves be displayed in respectively different display forms, so that the user can tell, on the map screen, which roads to take from the current position to reach the destination with respect to each of the plurality of travel routes.

In step S105, the control unit 10 has the traveling time calculation unit 18 calculate the actual traveling time of the vehicle 100 with respect to each travel route estimated in step S103. Under this circumstance, for example, the average passing-through time of each road indicated by the travel history DB 22, that is, a total value of the average passing-through time with respect to combinations of roads constituting the respective travel routes on the basis of the values of the average passing-through time 304 in the data structure illustrated in FIG. 3 is calculated. Consequently, the actual traveling time of the vehicle 100 with respect to each travel route can be calculated on the basis of the travel history DB 22.

In step S106, the control unit 10 has the traveling time calculation unit 18 calculate the predicted traveling time of the vehicle 100 with respect to each travel route estimated in step S103. Under this circumstance, for example, time required for the vehicle 100 to travel along each travel route from the current position to the destination from now is calculated based on the map DB 21. When this is performed, it is preferable that the communication control unit 11 be used to acquire, for example, traffic information indicating the current traffic status from, for example, an external server which is not illustrated in the drawing, and traffic information on which statistic processing has been executed, and the time required for the vehicle 100 to travel along each travel route be calculated by using this acquired traffic information. Consequently, it is possible to calculate the predicted traveling time of the vehicle 100 with respect to each travel route.

In step S107, the control unit 10 has the display control unit 14 display, on the display unit 30, the actual traveling time and the predicted traveling time with respect to each travel route, which were respectively calculated in steps S105 and S106, together with the map screen displayed in step S104. After executing the processing in step S107, the control unit 10 terminates the flowchart in FIG. 4.

Figure 5:
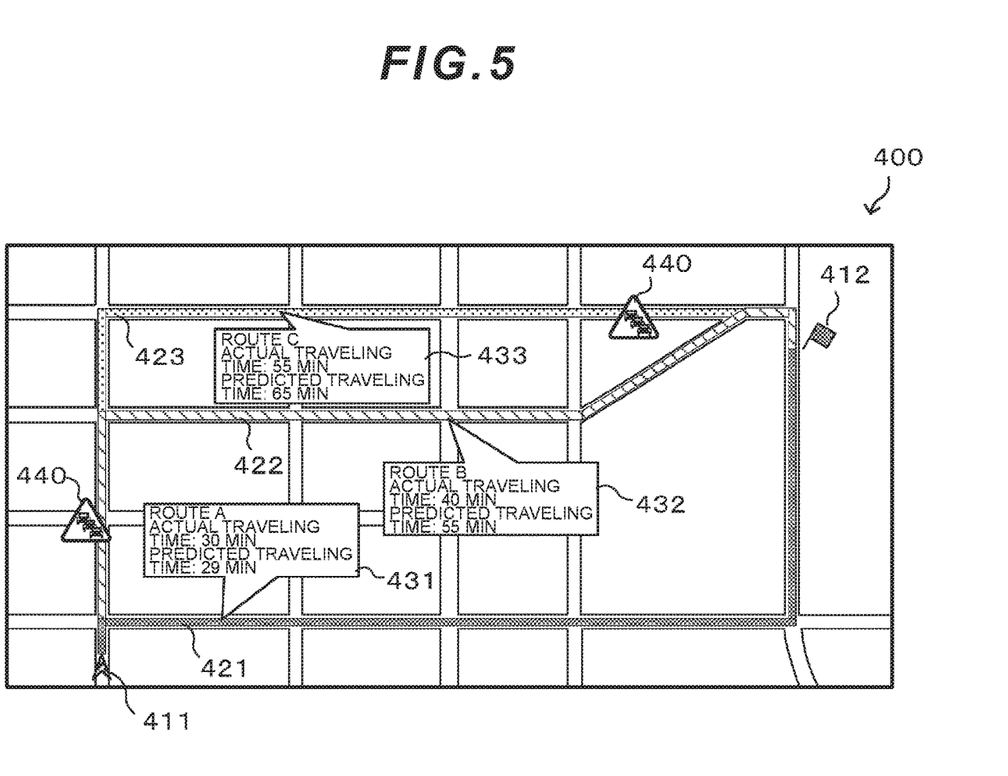
FIG. 5 is a diagram illustrating an example of a map screen according to the first embodiment of the present invention.

Next, a specific example of the map screen displayed on the display unit 30 for the in-vehicle apparatus 1 by the processing in FIG. 4 will be explained with reference to FIG. 5. FIG. 5 is a diagram illustrating an example of the map screen according to the first embodiment of the present invention.

A map screen 400 in FIG. 5 displays a map of three travel routes 421, 422, 423 from a current position 411 to a destination 412. These travel routes 421 to 423 are indicated with respectively different display colors so that the user can distinguish them from each other on the map screen 400. The travel route 421 represents a route with a combination of roads with the highest travel frequency. The travel route 422 represents a route with a combination of roads with the second highest travel frequency. The travel route 423 represents a route with a combination of roads with the third highest travel frequency. Incidentally, a congestion icon 440 indicating the occurrence of traffic congestion is displayed in the middle of each of the travel routes 422, 423.

Furthermore, notice frames 431 to 433 corresponding to the travel routes 421 to 423, respectively, are displayed on the map screen 400 in FIG. 5. The notice frame 431 indicates the actual traveling time and the predicted traveling time of the vehicle 100 with respect to the travel route 421. The notice frame 432 indicates the actual traveling time and the predicted traveling time of the vehicle 100 with respect to the travel route 422. The notice frame 433 indicates the actual traveling time and the predicted traveling time of the vehicle 100 with respect to the travel route 423. These notice frames 431 to 433 are displayed in step S107 in FIG. 4 and each notice frame indicates average passing-through time required when the vehicle 100 traveled through the relevant travel route 421 to 423 in the past, and predicted required time for the vehicle 100 to travel along the travel route 421 to 423 from now, respectively.

According to the first embodiment of the present invention described above, the following operational advantages are obtained.

(1) The in-vehicle apparatus 1 mounted in the vehicle 100 includes: the map DB 21 that stores the map information; the communication control unit 11 that acquires the traffic information; the travel history DB 22 in which the travel history of the vehicle 100 with respect to each road and traveling time with respect to the travel history are recorded; the route estimation unit 17 that estimates the travel routes 421 to 423 of the vehicle by using the map information of the map DB 21 and the travel history DB 22; the traveling time calculation unit 18 that calculates actual traveling time of the vehicle 100 with respect to the travel routes 421 to 423 estimated by the route estimation unit 17 by using the traveling time recorded in the travel history DB 22 and calculates predicted traveling time required when traveling the travel routes 421 to 423 estimated by the route estimation unit 17 by using the traffic information acquired by using the communication control unit 11; and the display control unit 14 that performs control to display the map screen 400 indicating the travel routes 421 to 423 on the display unit 30 and display the actual traveling time and the predicted traveling time, together with the map screen 400, on the display unit 30 by using the notice frames 431 to 433. Consequently, it is possible to notify the user of the difference in the traveling time from the usual traveling time with respect to the road(s) where the vehicle 100 is going to pass from now.

(2) The route estimation unit 17 estimates the plurality of travel routes 421 to 423 (step S103 in FIG. 4). The traveling time calculation unit 18 calculates the actual traveling time and the predicted traveling time with respect to each of the travel routes 421 to 423 (steps S105 and S106). The display control unit 14 indicates each of the travel routes 421 to 423 on the map screen 400 (step 3104) and also has the display unit 30 display the actual traveling time and the predicted traveling time with respect to each of the travel routes 421 to 423 (step S107), Consequently, it is possible to present useful information when selecting any one of the plurality of travel routes where the vehicle 100 usually and often passes.

(3) The route estimation unit 17 estimates the travel routes 421 to 423 by selecting combinations of roads from the current position of the vehicle 100 to the destination on the basis of the travel frequency of the vehicle 100 with respect to each road as indicated by the travel history DB 22 in step S103. Consequently, it is possible to estimate the roads where the vehicle 100 usually and often passes, as the travel routes with certainty.

(4) The route estimation unit 17 estimates the destination based on the travel history DB 22 in step S103. Consequently, the destination according to the user's behavior history can be estimated as the destination of the vehicle 100 even if the user does not set the destination.

Second Embodiment

Next, a second embodiment of the present invention will be explained. The above-explained first embodiment has described the example where the predicted traveling time of the vehicle 100 is calculated an displayed by assuming that the vehicle 100 will travel along the travel route by the user's driving operation. This embodiment will describe an example where the predicted traveling time of the vehicle 100 is calculated and displayed in consideration of a case where the vehicle 100 travels by automatic driving. Incidentally, the configuration of the information provision system according to this embodiment and the configuration of the in-vehicle apparatus 1 and the server 4 are respectively the same as those in FIG. 1 and FIG. 2 as explained with regard to the first embodiment. Therefore, an explanation of these configurations has been omitted in the following explanation.

Figure 6:
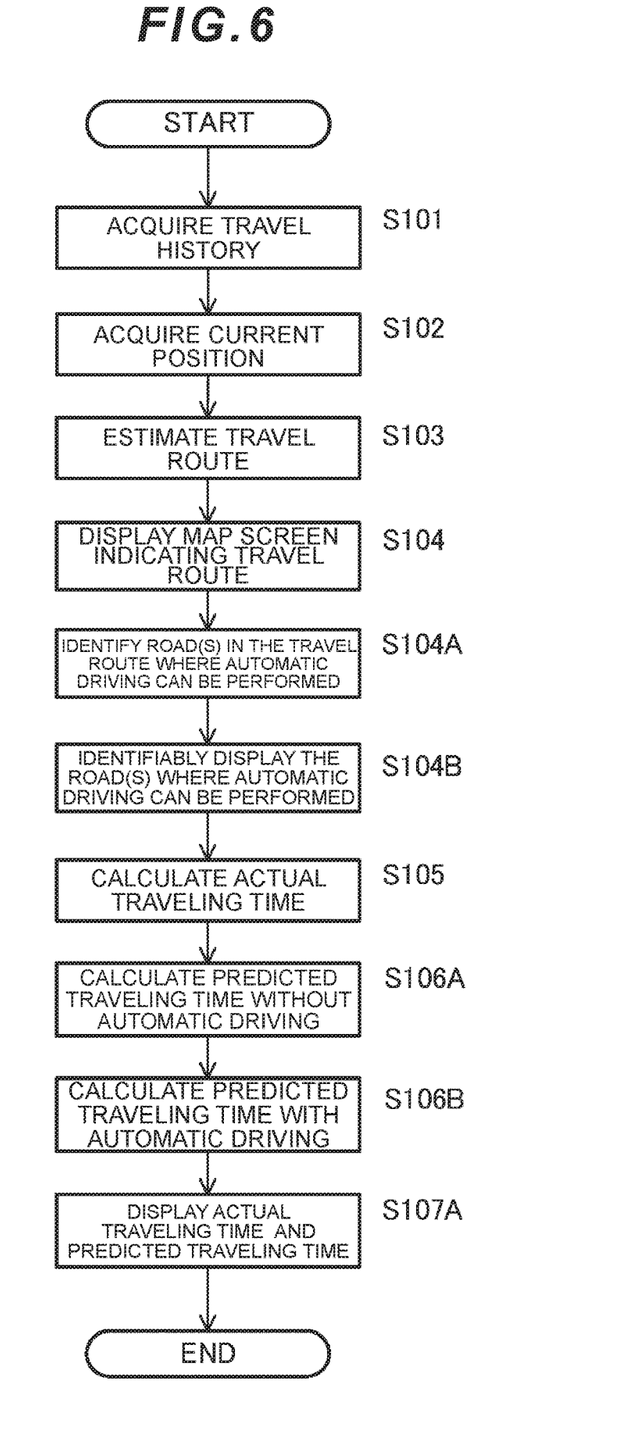
FIG. 6 is a flowchart illustrating actions of the in-vehicle apparatus in the information provision system according to a second embodiment of the present invention.

FIG. 6 is a flowchart illustrating actions of the in-vehicle apparatus 1 in the information provision system according to the second embodiment of the present invention. In this embodiment, for example, when the in-vehicle apparatus 1 is activated or when the destination is set to the in-vehicle apparatus 1, the control unit 10 for the in-vehicle apparatus 1 starts a processing flow illustrated in FIG. 6. Incidentally, regarding the processing flow in FIG. 6, the same step numbers as those in FIG. 4 are assigned to processing steps with the same content as that of the processing flow in FIG. 4 according to the first embodiment.

In each of steps S101 to S104, the control unit 10 executes the same processing as that explained in the first embodiment.

In step 3104A, the control unit 10 identifies a road(s) where the vehicle 100 can perform automatic driving along each travel route estimated in step S103. Under this circumstance, the road(s) in the travel route where the automatic driving can be performed is identified by, for example, judging whether or not the automatic driving can be performed on each road constituting the travel route, on the basis of the shape, the number of lanes, etc. of each road as indicated by the map DB 21. Alternatively, information indicating whether the automatic driving is possible or not may be included and recorded in the map DB 21 and the road(s) where the automatic driving can be performed may be identified based on such information. Furthermore, the automatic driving history of the vehicle 100 may be recorded in the travel history DB 22 and the road(s) where the automatic driving can be performed may be identified based on this information.

In step S104B, the control unit 10 has the display control unit 14 display the road(s) in the travel route where the automatic driving can be performed, which was identified in step S104A, in a form distinguishable from other roads. Under this circumstance, for example, the road part in the travel route where the automatic driving can be performed is surrounded by an enclosing line and displayed on the map screen displayed on the display unit 30 in step S104, so that the user can identify which part of the travel route is the road(s) where the automatic driving can be performed. Incidentally, any form may be used as long as the user can identify the road(s) in the travel route where the automatic driving can be performed.

In step S105, the control unit 10 has the traveling time calculation unit 18 calculate the actual traveling time of the vehicle 100 with respect to each travel route estimated in step S103 in the same manner as explained in the first embodiment.

In step S106A, the control unit 10 has the traveling time calculation unit 18 calculate the predicted traveling time of the vehicle 100 without automatic driving with respect to each travel route estimated in step S103. Under this circumstance, the predicted traveling time of the vehicle 100 with respect to each travel route is calculated by having the traveling time calculation unit 18 calculate the required time for the vehicle 100 to travel along each travel route from the current position to the destination from now on the basis of the traffic information acquired from the map DB 21 or from outside in the same manner as in step S106 explained in the first embodiment.

In step S106B, the control unit 10 has the traveling time calculation unit 18 calculate the predicted traveling time of the vehicle with automatic driving with respect to each travel route estimated in step S103. Under this circumstance, the predicted traveling time of the vehicle respect to each travel route is calculated by a method similar to that of step S106A by assuming that the vehicle 100 travels on the road(s) where the automatic driving can be performed, which was identified in step S104A, by automatic driving. When this is performed, the traveling time of the road(s) where the automatic driving can be performed may be judged based on, for example, the traffic information acquired from the map DB 21 or from outside or may be judged based on the automatic driving history of the vehicle 100 recorded in the travel history DB 22. Alternatively, the traveling time of the case where the vehicle 100 travels on the relevant road by automatic driving may be calculated by multiplying the traveling time of the relevant road, which was used to calculate the predicted traveling time without automatic driving in step S106A, by a specified multiplying factor. Incidentally, the traveling time calculation unit 18 excludes a travel route which does not include the road(s) where the automatic driving can be performed, from objects to calculate the predicted traveling time with automatic driving and omits the processing in step S106B.

In step 3107A, the control unit 10 has the display control unit 14 display the actual traveling time, the predicted traveling time without automatic driving, and the predicted traveling time with automatic driving with respect to each travel route, which were calculated in steps S105, S106A, and S106B, respectively, together with the map screen displayed in step S104 on the display unit 30. After executing the processing in step S107A, the control unit 10 terminates the flowchart in FIG. 6.

Figure 7:
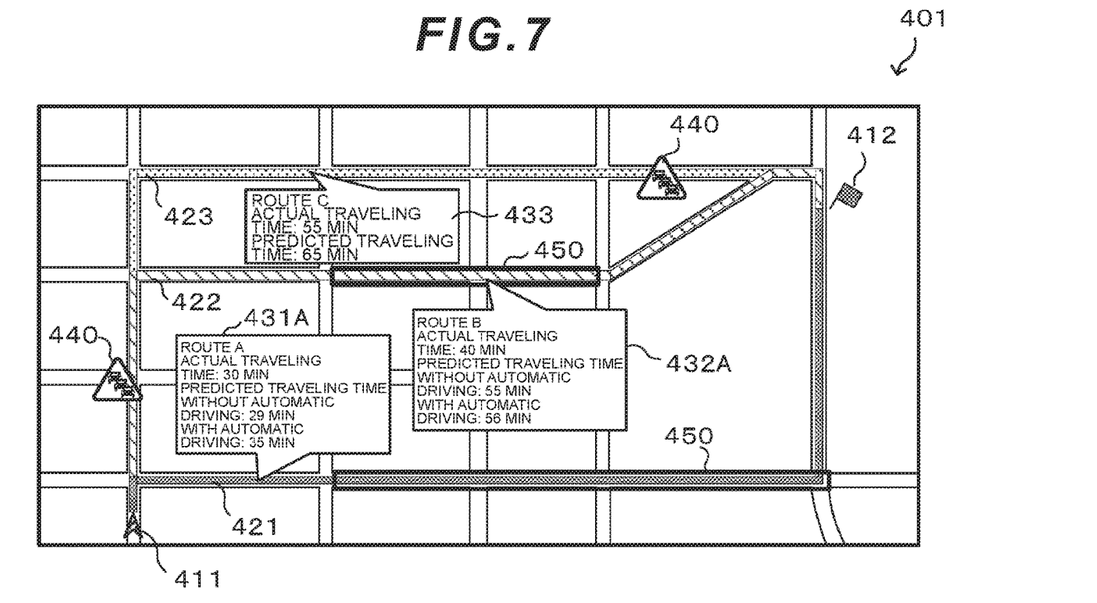
FIG. 7 is a diagram illustrating an example of a map screen according to the second embodiment of the present invention.

FIG. 7 is a diagram illustrating an example of a map screen according to the second embodiment of the present invention. A map screen 401 in FIG. 7 displays a map of three travel routes 421 to 423 from the current position 411 to the destination 412 in the same manner as the map screen 400 in FIG. 5 explained in the first embodiment. Of these travel routes, a part of each travel route 421, 422 is surrounded by an enclosing line 450 indicating that the relevant part is a road where the automatic driving can be performed. Specifically speaking, the part of the travel route 421, 422 where the vehicle 100 can travel by automatic driving is surrounded by the enclosing line 450 and is thereby displayed on the map screen 401 in a form distinguishable from other parts.

Furthermore, the map screen 401 in FIG. 7 displays notice frames 431A, 432A corresponding to the travel routes 421, 422, respectively, instead of the notice frames 431, 432 on the map screen 400 in FIG. 5. The notice frame 431A indicates the actual traveling time of the vehicle 100 and the predicted traveling time of the vehicle 100 with and without automatic driving with respect to the travel route 421. The notice frame 432A indicates the actual traveling time of the vehicle 100 and the predicted traveling time of the vehicle 100 with and without automatic driving with respect to the travel route 422. Incidentally, the travel route 423 does not include any road where the automatic driving can be performed, so that the notice frame 433 corresponding to the travel route 423 is similar to that displayed on the map screen 400 in FIG. 5.

According to the second embodiment of the present invention described above, the following operational advantages are further obtained in addition to (1) to (4) explained with regard to the first embodiment.

(5) The vehicle 100 can travel by automatic driving. The traveling time calculation unit 18 calculates the predicted traveling time required when the vehicle 100 travels along the travel route 421, 422 by automatic driving (step S106B in FIG. 6). The display control unit 14 causes the display unit 30 to display the thus-calculated predicted traveling time (step S107A). Consequently, it is possible to present useful information when the user judges whether the vehicle 100 should be made to travel by automatic driving or not.

(6) The display control unit 14 displays, on the map screen 401, the part of the travel routes 421, 422 where the vehicle 100 can travel by automatic driving, in a form distinguishable from other parts by using the enclosing line 450. Consequently, it is possible to make the user easily identify which part of the travel route is the road where the automatic driving can be performed.

(Variation)

Incidentally, in the second embodiment explained above, the display form of the part of the travel route where the vehicle 100 can travel by automatic driving may be changed based on the automatic driving history of the vehicle 100. In this case, for example, the automatic driving history of the vehicle 100 may be recorded, as part of the travel history of the vehicle, in the travel history DB 22.

Figure 8:
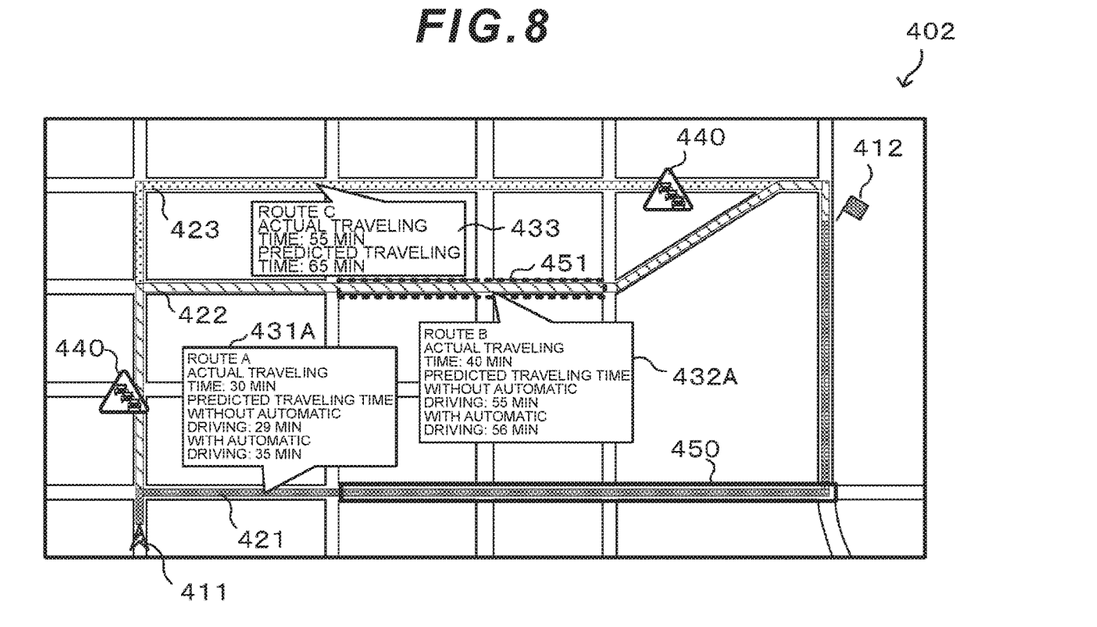
FIG. 8 is a diagram illustrating a variation of the map screen according to the second embodiment of the present invention.

FIG. 8 is a diagram illustrating a variation of the map screen according to the second embodiment of the present invention. A map screen 402 in FIG. 8 displays the enclosing line 450 indicating the part of the travel route 421 where the vehicle 100 can travel by automatic driving, and an enclosing line 451 indicating the part of the travel route 422 where the vehicle 100 can travel by automatic driving, in respectively different display forms. Under this circumstance, the enclosing line 450 indicates that the vehicle 100 traveled through the relevant part by automatic driving in the past; and the enclosing line 451 indicates that the vehicle 100 did not travel through the relevant part by automatic driving in the past.

According to the above-described variation of the second embodiment of the present invention, the following operational advantage is obtained in addition to (1) to (4) explained above with regard to the first embodiment and (5) and (6) explained above with regard to the second embodiment.

(7) The travel history recorded in the travel history DB 22 includes the automatic driving history of the vehicle 100 with respect to each road. The display control unit 14 changes the display form of a part of the travel routes 421, 422 where the vehicle 100 can travel by automatic driving, on the basis of the automatic driving history. Consequently, it is possible to easily make the user identify whether the automatic driving was performed in the past or not with respect to the road(s) in the travel route where the automatic driving can be performed.

Incidentally, the above-explained embodiment has described the example where the in-vehicle apparatus 1 acquires the travel history of the vehicle 100 from the server 4; however, the travel history of the vehicle 100 may be stored in the in-vehicle apparatus 1 in advance. In this case, the in-vehicle apparatus 1 may be designed to not connect to the server 4. Specifically speaking, in this case, the server 4 is unnecessary and the present invention can be implemented by only the in-vehicle apparatus 1.

The above-explained embodiment has described the example where the travel routes 421 to 423 can be distinguished from each other on the map screens 400 to 402 by color-coding and displaying the travel routes 421 to 423; however, each travel route may be made identifiable by, for example, changing shades or brightness of colors, line thickness or types, and a blinking rate with respect to each travel route instead of color-coding and displaying the travel routes.

Furthermore, the above-explained embodiment has described the example where three travel routes are estimated in descending order of the travel frequency of the vehicle 100; however, the number of the travel routes is not limited to this example. For example, only one travel route with the highest travel frequency may be estimated or four or more travel routes may be estimated. Alternatively, the number of travel routes to be estimated may be changed according to the distance to the destination or the travel frequency or the travel route(s) may be estimated without consideration of the travel frequency.

The above-explained embodiment has described the example where the map screens 400 to 402 indicating the travel routes 421 to 423 are displayed on the display unit 30 included in the in-vehicle apparatus 1; however, the travel routes 421 to 423 may be displayed on an external display device connected to the in-vehicle apparatus 1. For example, an HUD (Head-Up Display), projection mapping onto a road surface, a wearable display device such as a spectacle-type display, or an aerial imaging display can be used as the external display device. Furthermore, a display of, for example, a smartphone, a tablet PC, or a notebook PC can also be used as the external display device.

Figure 9:
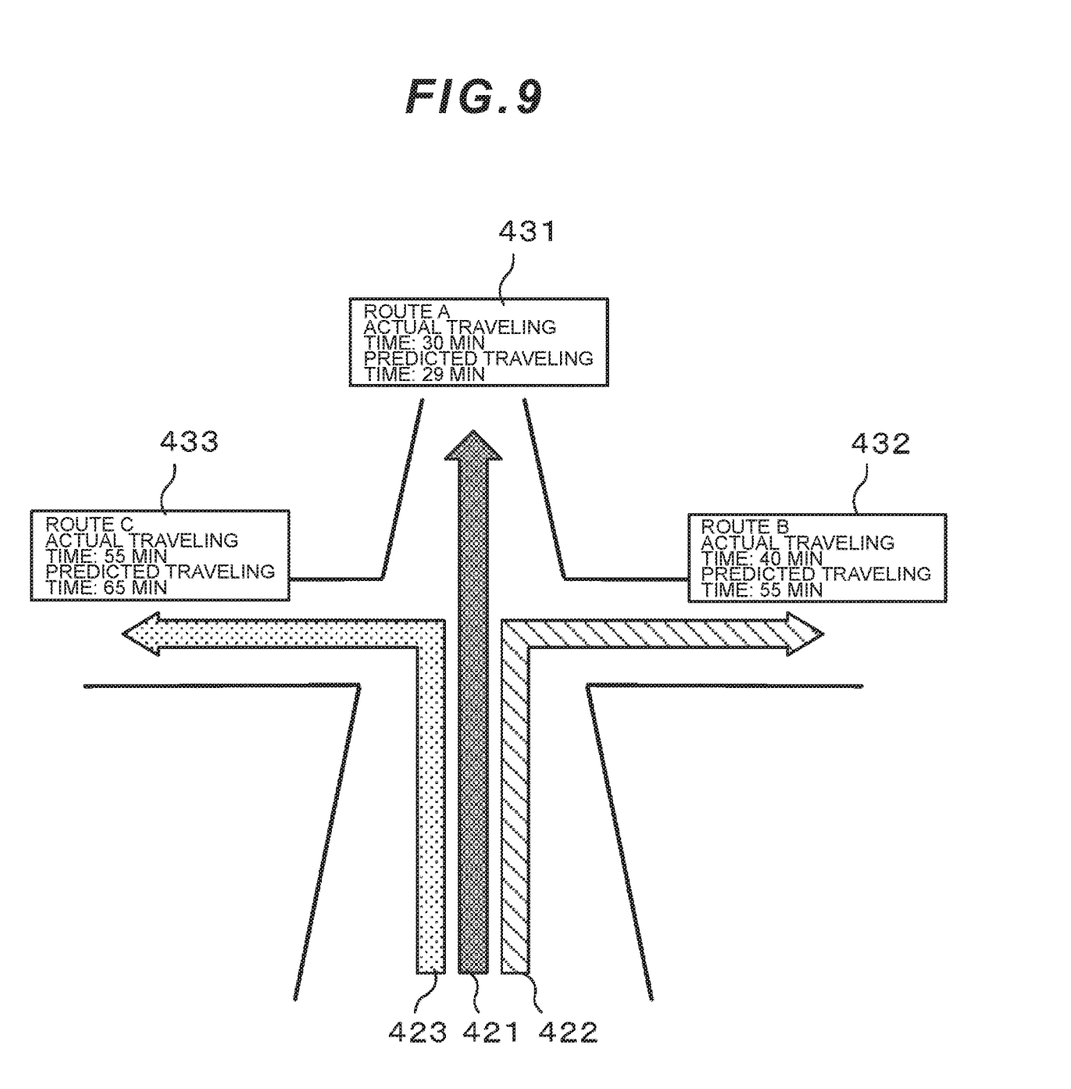
FIG. 9 is a diagram illustrating an example of displaying a travel route via a HUD or the projection mapping.

FIG. 9 is a diagram illustrating an example in which the travel routes 421 to 423 are displayed by means of an HUD or projection mapping. Referring to FIG. 9, the travel routes 421 to 423 are displayed by making them correspond to actual roads and actual traveling time and the predicted traveling time of the respective travel routes are displayed with notice frames 431 to 433. By using such display, it is also possible to notify the user of the actual traveling time and the predicted traveling time of each travel route.

The above-described embodiments and variations are merely examples. The present invention is not limited to the above-described embodiments unless they impair the features of the present invention; and other aspects which can be thought of within the scope of the technical idea of the present invention are also included within the scope of the present invention.

The disclosure of the following priority basic application is hereby incorporated by reference.

Japanese Patent Application No. 2017-240005 (filed on Dec. 14, 2017)

REFERENCE SIGNS LIST

1: in-vehicle apparatus
2: communication terminal
3: communication line network
4: server
5: front camera
6: side camera
7: vehicle control apparatus
10: control unit
11: communication control unit
12: interface control unit
13: current position acquisition unit
14: display control unit
15: vehicle information acquisition unit
16: vehicle control unit
17: route estimation unit
18: traveling time calculation unit
19: travel history recording unit
20: storage unit
21: map DB
22: travel history DB
30: display unit
40: operation input unit
50: current position detection unit
100: vehicle
110: control unit
111: communication control unit
112: distribution unit
113: information management unit
120: storage unit 121: travel history DB
122: user information DB

The invention claimed is:

1. An in-vehicle apparatus mounted in a vehicle for displaying travel routes and travel times, comprising:
   a storage device that stores a data structure including map information;
   a communication controller that retrieves traffic information from a remote storage medium;
   a travel history database, stored in the storage device, in which a data structure for a travel history of the vehicle with respect to each road and a data structure for traveling time with respect to the travel history are stored;
   a route estimation circuit that estimates a travel route of the vehicle by retrieving the data structure including the map information from the storage device, and the data structure for the travel history from the database;
   a traveling time calculation circuit that calculates an actual traveling time of the vehicle with respect to the travel route estimated by the route estimation circuit by using the data structure for the traveling time stored in the travel history database and calculates a predicted traveling time required when traveling along the travel route estimated by the route estimation circuit by using the traffic information retrieved by using the communication control unit; and
   a display controller to display a map screen indicating the travel route and to display the actual traveling time and the predicted traveling time together with the map screen, in a display device, wherein
   the traveling time calculation circuit calculates, as the predicted traveling time, traveling time required when the vehicle travels along the travel route by the automatic driving, wherein
   the display controller displays, on the map screen, a part of the travel route where the vehicle can travel by the automatic driving in a form distinguishable from other parts of the travel route, and wherein
   the data structure for the travel history recorded in the travel history database further includes a plurality of travel links, a direction of travel for each travel link indicating towards which link the vehicle was traveling, a number of times of passages through each travel link, and average passing time through each travel link.

2. The in-vehicle apparatus according to claim 1, wherein the route estimation circuit estimates a plurality of travel routes; wherein
   the traveling time calculation circuit calculates the actual traveling time and the predicted traveling time, respectively, with respect to the plurality of travel routes; and wherein
   the display controller displays each of the plurality of travel routes on the map screen and display the actual traveling time and the predicted traveling time, respectively, with respect to the plurality of travel routes.

3. The in-vehicle apparatus according to claim 1, wherein the route estimation circuit estimates the travel route by selecting a combination of roads from a current position of the vehicle to a destination on the basis of a travel frequency of each road for the vehicle which is indicated by the travel history database.

4. The in-vehicle apparatus according to claim 3, wherein the route estimation circuit estimates the destination based on the travel history database.

5. A method for displaying travel routes and travel times in the vehicle, the method comprising:
   acquiring traffic information from a remote storage device, via a computer network;
   storing a data structure for a travel history of a vehicle with respect to each road and a data structure for traveling time with respect to the travel history;
   estimating a travel route of the vehicle by retrieving the data structure including the map information from the storage device, and the data structure for the travel history from a travel history database;
   calculating an actual traveling time of the vehicle with respect to the estimated travel route by using the stored data structure for the traveling time and calculating a predicted traveling time required when traveling along the estimated travel route by using the retrieved traffic information;
   displaying, on a display screen, a map screen indicating the travel route; and
   displaying the actual traveling time and the predicted traveling time together with the map screen, on the display screen; and
   calculating, as the predicted traveling time, traveling time required when the vehicle travels along the travel route by automatic driving, wherein
   displaying, on the map screen, a part of the travel route where the vehicle can travel by the automatic driving in a form distinguishable from other parts of the travel route, and wherein
   the data structure for the travel history recorded in the travel history database further includes a plurality of travel links, a direction of travel for each travel link indicating towards which link the vehicle was traveling, a number of times of passages through each travel link, and average passing time through each travel link.

6. The method according to claim 5, wherein when estimating the travel route of the vehicle, a plurality of travel routes is estimated; wherein
   when calculating the actual traveling time and the predicted traveling time of the vehicle, the actual traveling time and the predicted traveling time are calculated, respectively, with respect to the plurality of the estimated travel routes; wherein
   when displaying the map screen, each of the plurality of travel routes is displayed on the map screen; and wherein
   when displaying the actual traveling time and the predicted traveling time, the actual traveling time and the predicted traveling time are displayed, respectively, with respect to the plurality of travel routes.

7. The method according to claim 5, wherein when estimating the travel route of the vehicle, the travel route is estimated by selecting a combination of roads from a current position of the vehicle to a destination on the basis of a travel frequency of each road for the vehicle which is indicated by the travel history.

8. The method according to claim 7, wherein when estimating the travel route of the vehicle, the destination is estimated based on the travel history.

* * * * *